(12) United States Patent
Sarferaz

(10) Patent No.: US 11,625,602 B2
(45) Date of Patent: Apr. 11, 2023

(54) DETECTION OF MACHINE LEARNING MODEL DEGRADATION

(71) Applicant: SAP SE, Walldorf (DE)

(72) Inventor: Siar Sarferaz, Heidelberg (DE)

(73) Assignee: SAP SE, Walldorf (DE)

( * ) Notice: Subject to any disclaimer, the term of this patent is extended or adjusted under 35 U.S.C. 154(b) by 744 days.

(21) Appl. No.: 16/567,695

(22) Filed: Sep. 11, 2019

(65) Prior Publication Data

US 2021/0073627 A1 Mar. 11, 2021

(51) Int. Cl.
- *G06N 3/08* (2006.01)
- *G06N 20/20* (2019.01)
- *G06N 3/084* (2023.01)

(52) U.S. Cl.
CPC ............... *G06N 3/08* (2013.01); *G06N 3/084* (2013.01)

(58) Field of Classification Search
CPC .......... G06N 20/00; G06N 3/08; G06N 3/084; G06N 20/20; G06N 5/04
See application file for complete search history.

(56) References Cited

U.S. PATENT DOCUMENTS

| | | | |
|---|---|---|---|
| 9,449,344 B2 | 9/2016 | Deshpande et al. | |
| 9,934,203 B2 | 4/2018 | Bahgat et al. | |
| 10,438,212 B1 * | 10/2019 | Jilani | G06N 5/025 |
| 2017/0243133 A1 | 8/2017 | Zavesky | |
| 2018/0165599 A1 | 6/2018 | Pete et al. | |
| 2018/0211260 A1 * | 7/2018 | Zhang | G06N 20/00 |
| 2019/0068365 A1 | 2/2019 | Wright et al. | |

FOREIGN PATENT DOCUMENTS

| | | | |
|---|---|---|---|
| EP | 3483797 | * | 11/2018 |
| EP | 3422262 A1 | | 1/2019 |
| EP | 3483797 A1 | | 5/2019 |

* cited by examiner

*Primary Examiner* — Yosef K Laekemariam
(74) *Attorney, Agent, or Firm* — Mintz Levin Cohn Ferris Glovsky and Popeo, P.C.

(57) ABSTRACT

A method may include training, based on a first training dataset, a machine learning model. A degradation of the machine learning model may be detected based on one or more accuracy key performance indicators including a prediction power metric and a prediction confidence metric. The degradation of the machine learning model may also be detected based on a drift and skew in an input dataset and/or an output dataset of the machine learning model. Furthermore, the degradation of the machine learning model may be detected based on an explicit feedback and/or an implicit feedback on a performance of the machine learning model. In response to detecting the degradation of the machine learning model, the machine learning model may be retrained based on a second training dataset that includes at least one training sample not included in the first training dataset. Related systems and articles of manufacture are also provided.

19 Claims, 6 Drawing Sheets

DETECTION OF MACHINE LEARNING MODEL DEGRADATION

TECHNICAL FIELD

The subject matter described herein relates generally to machine learning and more specifically to detecting the degradation of a trained machine learning model.

BACKGROUND

Machine learning models may be trained to perform a variety of cognitive tasks including, for example, object identification, natural language processing, information retrieval, speech recognition, and/or the like. For example, an enterprise resource planning (ERP) system may include an issue tracking system configured to generate a ticket in response to an error reported via one or more telephone calls, emails, short messaging service (SMS) messages, social media posts, web chats, and/or the like. The issue tracking system may generate the ticket to include a textual description of the error associated with the ticket. As such, in order to determine a suitable response for addressing the error associated with the ticket, the enterprise resource planning system may include a machine learning model trained to perform text classification. For instance, the machine learning model may be trained to determine, based at least on the textual description of the error, a priority for the ticket corresponding to a severity of the error.

SUMMARY

Systems, methods, and articles of manufacture, including computer program products, are provided for detecting the degradation of a machine learning model. In one aspect, there is provided a system. The system may include at least one data processor and at least one memory. The at least one memory may store instructions that result in operations when executed by the at least one data processor. The operations may include: training, based at least on a first training dataset, a machine learning model; detecting, based at least on one or more accuracy key performance indicators associated with the machine learning model, a degradation of the machine learning model, the one or more accuracy key performance indicators including a prediction power metric measuring an ability of the machine learning model to generate, for each input value, a correct output value; and in response to detecting the degradation of the machine learning model, retraining the machine learning model, the machine learning model retrained based at least on a second training dataset that includes at least one training sample not included in the first training dataset.

In some variations, one or more features disclosed herein including the following features may optionally be included in any feasible combination. The one or more accuracy key performance indicators may further include a prediction confidence metric measuring an ability of the machine learning model to achieve a same performance for different input datasets having one or more same characteristics as the first training dataset.

In some variations, the machine learning model may be trained to perform a text classification including by assigning, to one or more tickets generated by an issue tracking system, a priority corresponding to a severity of an error associated with the one or more tickets. The degradation of the machine learning model may be further detected based on a drift and skew in a distribution of an input dataset of the machine learning model. The drift and skew in the input dataset of the machine learning model may be detected based at least on a change in a content of the one or more tickets generated by the issue tracking system.

In some variations, the degradation of the machine learning model may be further detected based on a drift and skew in a distribution of an output dataset of the machine learning model. The drift and skew in the distribution of the output dataset of the machine learning model may be detected based at least on a change in a relative proportion of tickets being assigned a first priority by the machine learning model and tickets assigned a second priority by the machine learning model.

In some variations, the degradation of the machine learning model may be further detected based on a feedback received from a user associated with the enterprise resource planning system. The feedback may include explicit feedback comprising the user ranking, voting, flagging, polling, and/or commenting on a performance of the enterprise resource planning system and/or the machine learning model. The feedback may also include implicit feedback comprising the user confirming and/or modifying a priority assigned to the one or more tickets by the machine learning model.

In some variations, the first training dataset and the second training dataset may each include a plurality of training samples. Each of the plurality of training samples may include a ticket assigned a correct priority. An error in an output of the machine learning model may correspond to a difference between a priority assigned to each of the plurality of training samples by the machine learning model and the correct priority associated with each of the plurality of training samples. The machine learning model may be trained and retrained by at least minimizing the error in the output of the machine learning model. The error in the output of the machine learning model may be minimized by at least adjusting one or more weights applied by the machine learning model until a gradient of an error function associated with the machine learning model converges to a threshold value.

In some variations, the machine learning model may include a neural network, a regression model, an instance-based model, a regularization model, a decision tree, a random forest, a Bayesian model, a clustering model, an associative model, a dimensionality reduction model, and/or an ensemble model.

In another aspect, there is provided a method for detecting the degradation of a machine learning model. The method may include: training, based at least on a first training dataset, a machine learning model; detecting, based at least on one or more accuracy key performance indicators associated with the machine learning model, a degradation of the machine learning model, the one or more accuracy key performance indicators including a prediction power metric measuring an ability of the machine learning model to generate, for each input value, a correct output value; and in response to detecting the degradation of the machine learning model, retraining the machine learning model, the machine learning model retrained based at least on a second training dataset that includes at least one training sample not included in the first training dataset.

In some variations, one or more features disclosed herein including the following features may optionally be included in any feasible combination. The one or more accuracy key performance indicators may further include a prediction confidence metric measuring an ability of the machine learning model to achieve a same performance for different input datasets having one or more same characteristics as the first training dataset.

In some variations, the degradation of the machine learning model may be further detected based on a drift and skew in a first distribution of an input dataset of the machine learning model and/or a second distribution of an output dataset of the machine learning model.

In some variations, the degradation of the machine learning model may be further detected based on an implicit feedback and/or an explicit feedback received from a user associated with an enterprise resource planning system implemented using the machine learning model.

In some variations, the machine learning model may include a neural network, a regression model, an instance-based model, a regularization model, a decision tree, a random forest, a Bayesian model, a clustering model, an associative model, a dimensionality reduction model, and/or an ensemble model.

In another aspect, there is provided a computer program product that includes a non-transitory computer readable storage medium. The non-transitory computer-readable storage medium may include program code that causes operations when executed by at least one data processor. The operations may include: training, based at least on a first training dataset, a machine learning model; detecting, based at least on one or more accuracy key performance indicators associated with the machine learning model, a degradation of the machine learning model; and in response to detecting the degradation of the machine learning model, retraining the machine learning model, the machine learning model retrained based at least on a second training dataset that includes at least one training sample not included in the first training dataset.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to detecting the degradation of a trained machine learning model, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
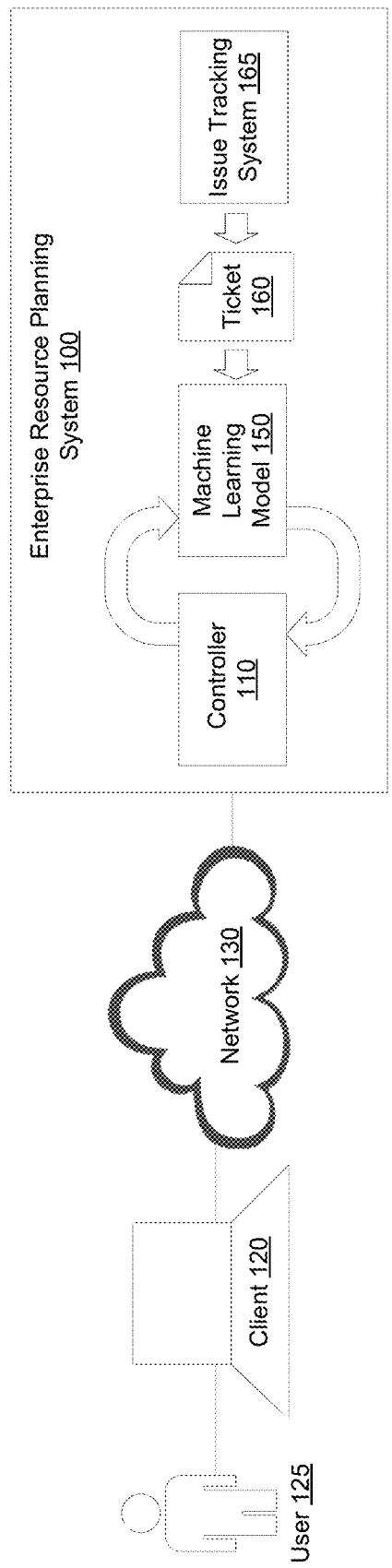
FIG. 1 depicts a system diagram illustrating an enterprise resource planning system, in accordance with some example embodiments.

A machine learning model may be trained, based at least on a training dataset, to perform a variety of cognitive tasks including, for example, object identification, natural language processing, information retrieval, speech recognition, and/or the like. The performance of the trained machine learning model may be subsequently qualified by at least applying the trained machine learning model to a validation dataset and/or a test dataset. If the performance of the trained machine learning model exceeds a threshold value, the trained machine learning model may be deployed to a production environment. For example, a machine learning model trained to perform text classification may be deployed as part of an enterprise resource planning system in order to determine the priority of the tickets generated by an issue tracking system. Nevertheless, the performance of the machine learning model may deteriorate while in production due to the machine learning model being subject to input datasets that deviate from the training dataset used to train the machine learning model. As such, in some example embodiments, a machine learning model controller may be configured to detect a degradation of the machine learning model. Furthermore, the machine learning model controller may retrain the machine learning model in the event the machine learning model controller detects the degradation of the machine learning model.

A machine learning model may include a function mapping a first value to a second value corresponding to the first value. For example, the machine learning model trained to perform text classification may include a function assigning, based at least on a text associated with a ticket, the ticket to a priority corresponding to a severity of the error associated with the ticket. Training the machine learning model may include determining a function that is able to assign a correct priority to the ticket. Moreover, the performance of the machine learning model may correspond to an error between the priority assigned to the ticket and the correct priority of the ticket. Accordingly, in some example embodiments, the machine learning model controller may detect a degradation of a machine learning model based at least on one or more accuracy key performance indicators (KPIs) including, for example, a predictive power metric, a prediction confidence metric, and/or the like. The predictive power metric may measure an ability the machine learning model to generate, for each input value, a correct output value. Meanwhile, the prediction confidence metric may measure an ability of the machine learning model to achieve a same performance across different input datasets. A decrease in the predictive power metric and/or the predictive confidence metric of the machine learning model may indicate a corresponding deterioration in the performance of the machine learning model.

In some example embodiments, the machine learning model controller may detect a degradation of the machine learning model by at least detecting a drift and skew in the distribution of an input dataset and/or an output dataset of the machine learning model. A drift and skew in the distribution of the input dataset and/or the output dataset of the machine learning model may indicate a deterioration in the performance of the machine learning model. For example, the machine learning model controller may detect a degradation of the machine learning model in response to detecting a change in the relative proportions of tickets assigned a first priority and tickets assigned a second priority. Alternatively and/or additionally, the controller may detect a degradation of the machine learning model in response to detecting a change in the content of the tickets generated by the issue tracking system. For instance, the tickets generated by the issue tracking system may include different words, a different frequency of words, and/or the like.

In some example embodiments, the machine learning model controller may detect, based at least on user feedback, a degradation of the machine learning model. User feedback may be indicative of the performance of the machine learning model. For example, the user feedback may include explicit feedback collected through direct interaction with one or more users of the enterprise resource planning system. Explicit feedback may include, for example, one or more indications of a user's experience with the enterprise resource planning system such as the user rating a quality of the enterprise resource planning system and/or the issues tracking system. Alternatively and/or additionally, the user feedback may include implicit feedback derived based on the user's interactions with the enterprise resource planning system. For instance, implicit feedback may include a user responding to a ticket being assigned a first priority by confirming the first priority assigned to the ticket or reassigning a second priority to the ticket instead.

FIG. 1 depicts a system diagram illustrating an enterprise resource planning (ERP) system 100, in accordance with some example embodiments. Referring to FIG. 1, the enterprise resource planning system 100 may include a controller 110, a client 120, and a database 130. As shown in FIG. 1, the controller 110 and the client 120 may be communicatively coupled via a network 130. It should be appreciated that the client 120 may be any processor-based device including, for example, a smartphone, a tablet computer, a wearable apparatus, a virtual assistant, an Internet-of-Things (IoT) appliance, and/or the like. The network 130 may be any wired and/or wireless network including, for example, a wide area network (WAN), a local area network (LAN), a virtual local area network (VLAN), a public land mobile network (PLMN), the Internet, and/or the like.

The controller 110 may be configured to monitor the performance of a machine learning model 150 deployed as part of the enterprise resource planning system 100. For example, the machine learning model 150 may be trained to classify text associated with a ticket 160 generated by an issue tracking system 165 in response to an error reported by a user 125 associated with the client 120. The machine learning model 150 may classify the text associated with the ticket 160 in order to assign, to the ticket 160, a priority corresponding to a severity of the error associated with the ticket 160. The machine learning model 150 may be any type of machine learning model including, for example, a neural network, a regression model, an instance-based model, a regularization model, a decision tree, a random forest, a Bayesian model, a clustering model, an associative model, a dimensionality reduction model, an ensemble model, and/or the like.

The machine learning model 150 may be a function mapping a first value to a second value corresponding to the first value. For example, the machine learning model 150 may include a function assigning, based at least on the text associated with the ticket 160, the ticket 160 to a priority corresponding to a severity of the error associated with the ticket. Training the machine learning model 150 may thus include determining a function that is able to assign a correct priority to the ticket 160. For instance, training the machine learning model 150 may include determining a gradient of an error function (e.g., mean squared error (MSE), cross entropy, and/or the like) associated with the machine learning model 150 by at least backward propagating the error in an output of the machine learning model 150. Moreover, training the machine learning model 150 may include minimizing the error in the output of the machine learning model 150 by at least adjusting one or more weights applied by the machine learning model 150 until the gradient of the error function converges, for example, to a local minimum and/or another threshold value.

The machine learning model 150 may be trained based at least on a training dataset that includes, for example, one or more training samples associated with ground-truth labels. For example, the machine learning model 150 may be trained based on a training dataset that includes tickets that have been assigned a correct priority. Nevertheless, the machine learning model 150 may degrade subsequent to deployment due to the machine learning model 150 being subject to input datasets that deviate from the training dataset used to train the machine learning model 150. As such, in some example embodiments, the controller 110 may detect a degradation of the machine learning model 150 including, for example, a deterioration in the performance of the machine learning model 150. Furthermore, the controller 110 may respond to detecting the degradation of the machine learning model 150 by at least retraining the machine learning model 150. For instance, the controller 110 may detect, based at least on one or more accuracy key performance indicators (KPIs) associated with the machine learning model 150, the degradation of the machine learning model 150. Degradation of the machine learning model 150 may also be detected based at least on a drift and skew in an input dataset of the machine learning model 150 and/or an output dataset of the machine learning model 150. Alternatively and/or additionally, the controller 110 may detect, based at least on feedback received from the user 125, the degradation of the machine learning model 150.

In some example embodiments, the accuracy key performance indicators associated with the machine learning model 150 may include a predictive power metric measuring a robustness of the machine learning model 150, which may correspond to an ability of the machine learning model 150 to generate, for each input value, a correct output value. For example, the predictive power metric associated with the machine learning model 150 may measure an ability of the machine learning model 150 to assign a correct priority to the ticket 160. The predictive power metric may have a value between 0% and 100%. A predictive power metric of 100% may indicate a hypothetically perfect model capable of accounting for 100% of the variations in the ground truth labels based on the explanatory variables present in the corresponding training samples whereas a predictive power of 0 may indicate a purely random model with no predictive power. The predictive power metric of the machine learning model 150 may be improved by at least adding variables to the training dataset and combining explanatory variables. Nevertheless, it should be appreciated that the threshold for the predictive power metric associated with the machine learning model 150 may vary based on application of the machine learning model 150.

In some example embodiments, the accuracy key performance indicators associated with the machine learning model 150 may include a predictive confidence metric measuring a reliability of the machine learning model 150, which may correspond to an ability of the machine learning model 150 to achieve a same performance across different input datasets having the same characteristics as the training dataset. The predictive confidence metric associated with the machine learning model 150 may have a value between 0% and 100%. A higher predictive confidence metric may indicate that the machine learning model 150 has a greater ability for generalization and a lower risk for generating unreliable results when applied to new input datasets. It should be appreciated that the machine learning model 150 may be sufficiently robust if the predictive confidence metric of the machine learning model 150 exceeds a threshold value (e.g., 95% or a different value). Moreover, the prediction confidence metric of the machine learning model 150 may be improved by increasing the quantity of training samples in the training dataset used to train the machine learning model 150.

The controller 110 may monitor the performance of the machine learning model 150 including by monitoring the one or more accuracy key performance metrics (KPIs). For example, the controller 110 may monitor the predictive power metric and/or the predictive confidence metric associated with the machine learning model 150. A decrease in the predictive power metric and/or the predictive confidence metric associated with the machine learning model 150 may indicate a change in the relationship between the input samples being received at the machine learning model 150 and the correct labels associated with these input samples. Accordingly, in response to detecting the decrease in the predictive power metric and/or the predictive confidence metric of the machine learning model 150, the controller 110 may retrain the machine learning model 150 based on a training dataset that includes at least one training sample that is not present in the training dataset previously used to train the machine learning model 150.

In some example embodiments, the controller 110 may detect the degradation of the machine learning model 150 in response to detecting a drift and skew in the distribution of an input dataset and/or an output dataset of the machine learning model 150. For example, the controller 110 may monitor the output dataset of the machine learning model 150 deployed at the enterprise resource planning system 100 to assign a priority to the tickets generated by the issue tracking system 165. The controller 110 may detect a drift and skew in the distribution of the output dataset of the machine learning model 150 if the controller 110 detects a change in the relative proportions of tickets being assigned a first priority and tickets being assigned a second priority. Alternatively and/or additionally, the controller 110 may monitor the input dataset of the machine learning model 150 deployed at the enterprise resource planning system 100. The controller 110 may detect a drift and skew in the input dataset of the machine learning model 150 if the controller 110 detects a change in the content of the tickets generated by the issue tracking system 165. For instance, the controller 110 may detect a change in the words and/or a frequency of words included in the tickets generated by the issue tracking system 165.

In some example embodiments, the controller 110 may detect the degradation of the machine learning model 150 based on a feedback received from the user 125 via the client 120 including, for example, implicit feedback, explicit feedback, and/or the like. Feedback from the user 125 may be subject to bias. For example, implicit feedback from the user 125 may be subject to event-related bias while explicit feedback from the user 125 may be subject to demographic bias. Accordingly, the feedback received from the user 125 may be preprocessed, for example, to minimize bias, prior to being used by the controller 110 to detect the degradation of the machine learning model 150.

Figure 2B:
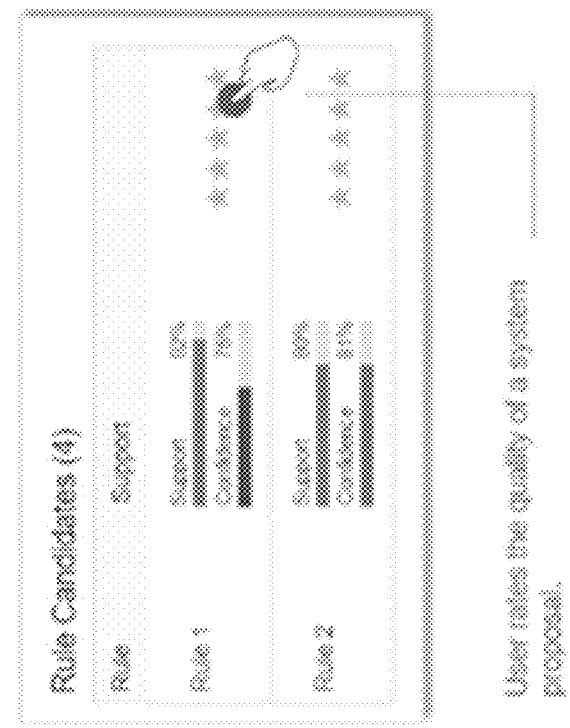
FIG. 2B depicts an example of an explicit feedback, in accordance with some example embodiments.
Figure 2A:
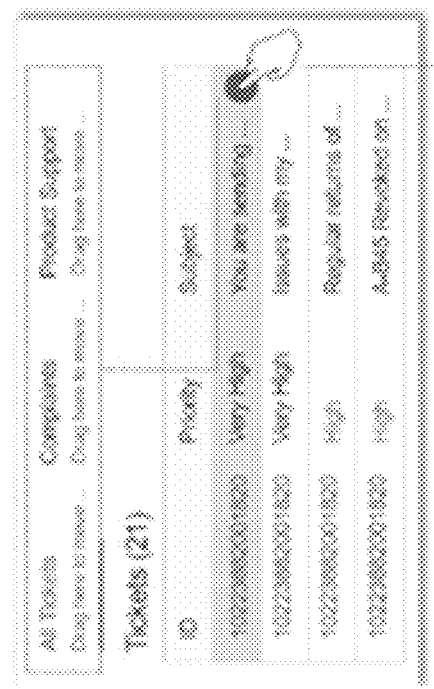
FIG. 2A depicts an example of an implicit feedback, in accordance with some example embodiments.

Implicit feedback may be derived by at least monitoring the user 125 interacting with the enterprise resource planning system 110 to at least confirm the output of the machine learning model and/or refute the output of the machine learning model 150. To further illustrate, FIG. 2A depicts an example of implicit feedback in which the user 125 responds to the ticket 160 being assigned a first priority by at least confirming the first priority assigned to the ticket 160 or reassigning a second priority to the ticket instead. It should be appreciated that the controller 110 may detect the degradation of the machine learning model 150 when the output of the machine learning model 150 is refuted more than a threshold quantity of times and/or at more than a threshold frequency. Alternatively and/or additionally, explicit feedback may be derived based on direct interactions with the user 125 including, for example, the user 125 ranking, voting, flagging, polling, and/or commenting on a performance of the enterprise resource planning system 110 and/or the machine learning model 150. To further illustrate, FIG. 2B depicts an example of explicit feedback in which a user interface is displayed at the client 120 to prompt the user 125 to rate the quality of the enterprise resource planning system 110.

In some example embodiments, the controller 110 may respond to detecting the degradation of the machine learning model 150 by at least retraining the machine learning model 150. For example, as noted, the controller 110 may retrain the machine learning model 150 based on a training dataset that includes at least one training sample that is not present in the training dataset previously used to train the machine learning model 150. In doing so, the controller 110 may increase at least the predictive power metric and/or the predictive confidence metric of the machine learning model 150 such that the retrained machine learning model 150 is able to assign a correct label to input samples in input datasets having a same characteristic as the training dataset used to retrain the machine learning model 150.

Figure 3:
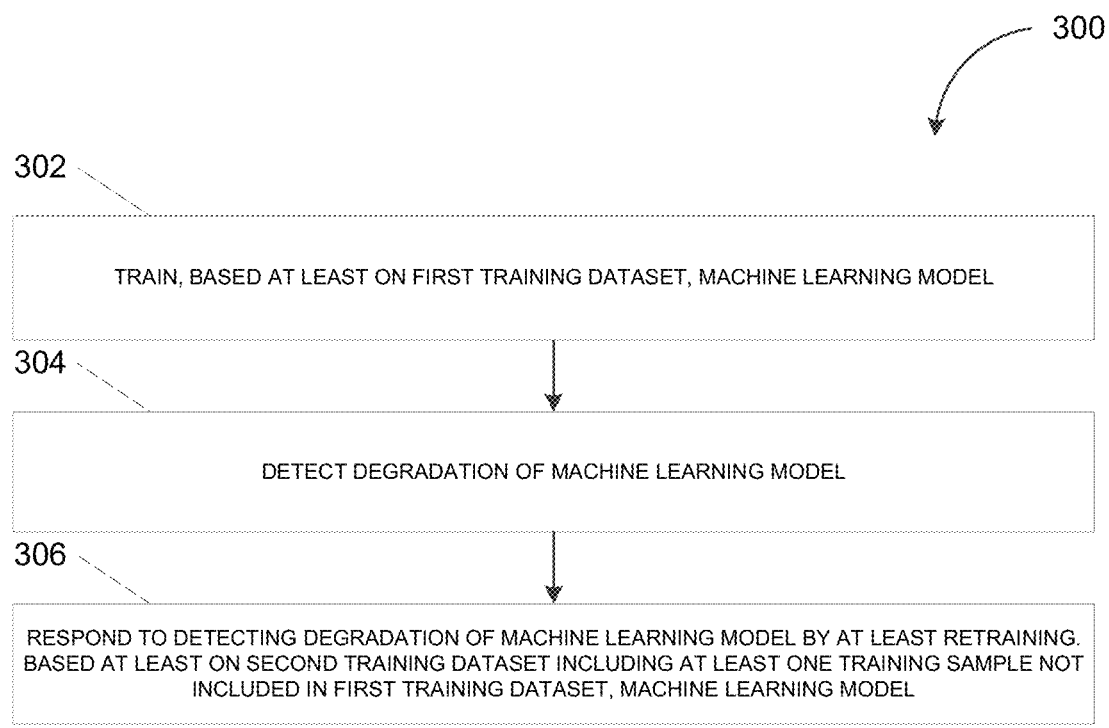
FIG. 3 depicts a flowchart illustrating an example of a process for detecting the degradation of a machine learning model, in accordance with some example embodiments.

FIG. 3 depicts a flowchart illustrating a process 300 for text classification, in accordance with some example embodiments. Referring to FIGS. 1 and 3, the process 300 may be performed by the controller 110 in order to detect the degradation of the machine learning model 150.

At 302, the controller 110 may train, based at least on a first training dataset, a machine learning model. For example, the controller 110 may train, based at least on a first training data, the machine learning model 150 prior to deploying the machine learning model 150 to the enterprise resource planning system. The machine learning model 150 may be trained to perform text classification in order to assign, based at least on the text associated with the ticket 160 generated by the issue tracking system 165, a priority corresponding to the severity of the error associated with the ticket 160. In some example embodiments, the machine learning model 150 may include a function assigning, based at least on the text associated with the ticket 160, the ticket 160 to a priority corresponding to a severity of the error associated with the ticket. Training the machine learning model 150 may thus include determining, based at least on the first training data, a function that is able to assign a correct priority to the ticket 160. Accordingly, the first training dataset may include a first plurality of training samples, each of which being a ticket that is associated with one or more ground-truth labels corresponding to a correct priority for the text associated with the ticket.

Training the machine learning model 150 may include determining a gradient of an error function (e.g., mean squared error (MSE), cross entropy, and/or the like) associated with the machine learning model 150 including by backward propagating the error in the output of the machine learning model 150. The error in an output of the machine learning model 150 may correspond to a difference between the labels the machine learning model 150 assigns to a training sample and the ground-truth labels associated with the training sample. Accordingly, training the machine learning model 150 may include minimizing the error in the output of the machine learning model 150 by at least updating one or more weights applied by the machine learning model 150 until the gradient of the error function converges, for example, to a local minimum and/or another threshold value.

At 304, the controller 110 may detect a degradation of the machine learning model. In some example embodiments, the controller 110 may detect the degradation of the machine learning model 150 based at least on one or more accuracy key performance indicators (KPIs) including, for example, a prediction power metric, a prediction confidence metric, and/or the like. The prediction power metric of the machine learning model 150 may measure an ability of the machine learning model 150 to generate, for each input value, a correct output value. Meanwhile, the prediction confidence metric of the machine learning model 150 may an ability of the machine learning model 150 to achieve a same performance across different input datasets having the same characteristics as the first training dataset. A decrease in the predictive power metric and/or the predictive confidence metric associated with the machine learning model 150 may indicate a change in the relationship between the input samples being received at the machine learning model 150 and the correct labels associated with these input samples.

In some example embodiments, the controller 110 may detect the degradation of the machine learning model 150 in response to detecting a drift and skew in the distribution of an input dataset and/or an output dataset of the machine learning model 150. For example, when the machine learning model 150 is deployed at the enterprise resource planning system 100 to assign a priority to the tickets generated by the issue tracking system 165, the controller 110 may detect a drift and skew in the distribution of the output dataset of the machine learning model 150 if the controller 110 detects a change in the relative proportions of tickets being assigned a first priority and tickets being assigned a second priority. Alternatively and/or additionally, the controller 110 may monitor the input dataset of the machine learning model 150 deployed at the enterprise resource planning system 100. The controller 110 may detect a drift and skew in the input dataset of the machine learning model 150 if the controller 110 detects a change in the content of the tickets generated by the issue tracking system 165 including, for example, a change in the words and/or a frequency of words included in the tickets generated by the issue tracking system 165.

In some example embodiments, the controller 110 may detect the degradation of the machine learning model 150 based on a feedback received from the user 125 via the client 120. The feedback received from the user 125 may include implicit feedback derived by at least monitoring the user 125 interacting with the enterprise resource planning system 110 to at least confirm the output of the machine learning model and/or refute the output of the machine learning model 150. Alternatively and/or additionally, the feedback received from the user 125 may include explicit feedback derived based on direct interactions with the user 125 including, for example, the user 125 ranking, voting, flagging, polling, and/or commenting on a performance of the enterprise resource planning system 110 and/or the machine learning model 150. As noted, the feedback received from the user 125 may be preprocessed to minimize bias (e.g., event-related bias, demographic bias, and/or the like) prior to being used by the controller 110 to detect the degradation of the machine learning model 150.

At 306, the controller 110 may respond to detecting the degradation of the machine learning model by at least retraining, based at least on a second training dataset that includes at least one training sample not included in the first training dataset, the machine learning model. For example, the controller 110 may respond to detecting the degradation of the machine learning model 150 by at least retraining the machine learning model 150 based on a second training dataset that includes at least one training sample not included in the first training dataset. Retraining the machine learning model 150 using one or more training samples that were not previously used to train the machine learning model 150 may increase the robustness and/or the reliability of the machine learning model 150. For instance, the controller 110 may retrain the machine learning model to at least increase the predictive power metric and/or the predictive confidence metric of the machine learning model 150 such that the retrained machine learning model 150 is able to assign a correct label to input samples in input datasets having a same characteristic as the second training dataset used to retrain the machine learning model 150.

Figure 4A:
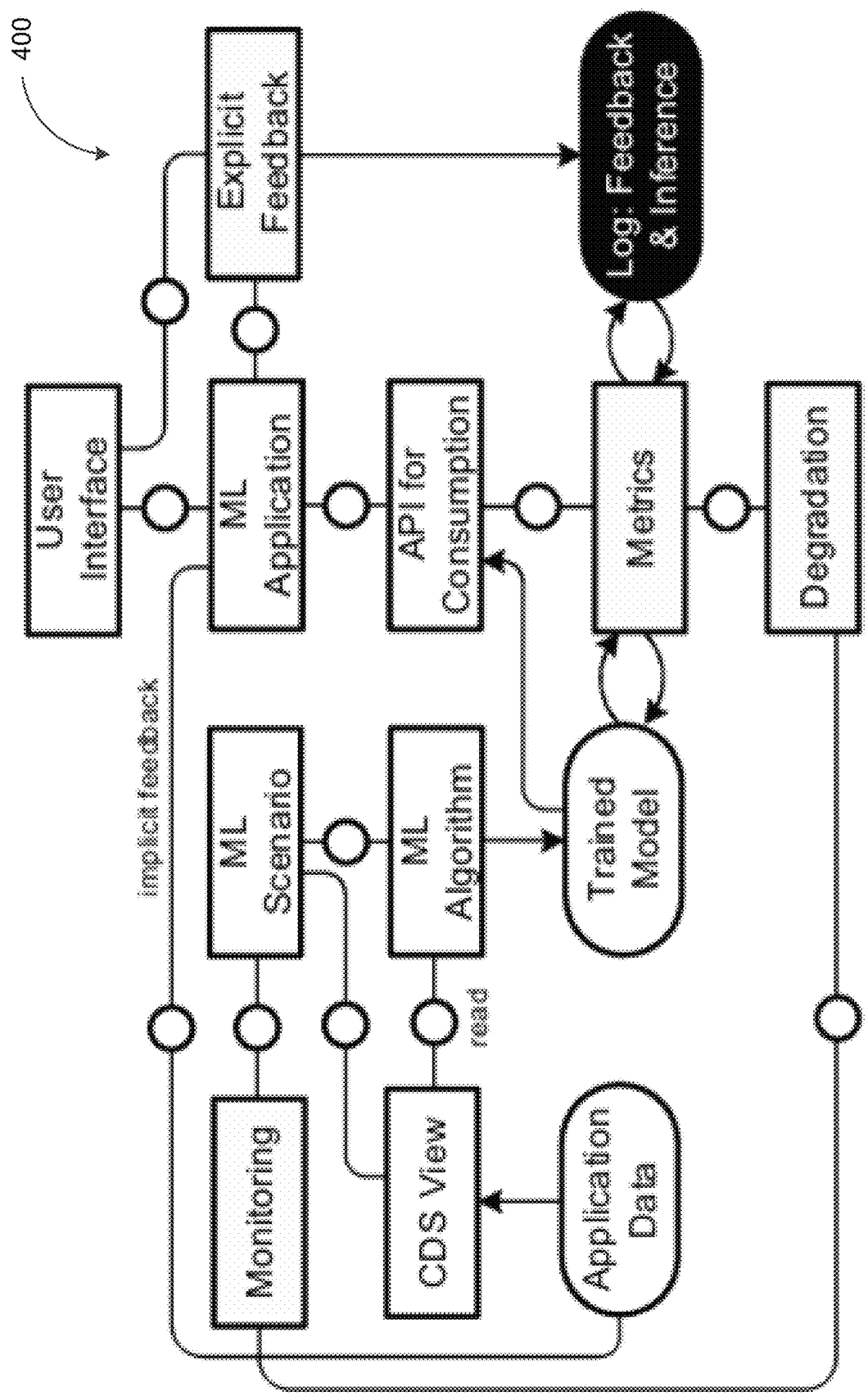
FIG. 4A depicts an example of an architecture of a controller configured to detect a degradation of a machine learning model, in accordance with some example embodiments.

FIG. 4A depicts an example of an architecture of a controller 400 configured to detect a degradation of a machine learning model, in accordance with some example embodiments. Referring to FIGS. 1 and 4A, the controller 400 may implement the controller 110 configured to detect the degradation of the machine learning model 150. As shown in FIG. 4A, a machine learning application may be represented by a machine learning scenario, which may be a design-time entity containing the required development objects for the machine learning use case (e.g., machine learning algorithms, training data views, and/or the like). The machine learning scenarios may ensure consistent lifecycle management as well as enable monitoring on a process level. Core data service views may be defined based on the application tables to represent the semantic data model. The core data service views may hide the underlying database models by at least wrapping the database models in one or more human-readable entities. The core data service view may include the structure query language view definition as well as contain domain-specific metadata (e.g., annotations). A corresponding core data service view may be provided for each machine learning application. The machine learning algorithms may read the application data during the training process while the resulting trained machine learning model may be stored in a database system.

For consumption, the trained machine learning model may be wrapped with the corresponding application programming interface (API) in order to enable the machine learning capabilities of the trained machine learning model to be accessible to one or more processes. The metrics component of the controller 400 may compute one or more accuracy key performance indicators (KPIs) during the training process by at least dividing the application data into one or more training datasets and validation datasets, with the validation data sets being used to gauge the performance of the trained machine learning model. Furthermore, the metrics component of the controller 400 may perform drift and skew detection by continuously analyzing a stream of inference calls to determine a distribution of an input data set and/or an output dataset of the trained machine learning model. It should be appreciated that some techniques for drift and skew detection may require a temporary storage of the interference data whereas other techniques for drift and skew detection may process the inference data in real-time without persisting any of the inference data.

The degradation component of the controller 400 may interpret the accuracy key performance indicators and generate recommendations for the monitoring component of the controller 400 that include, for example, retrain the machine learning model, adjust the definition of the machine learning model, and/or the like. Implicit feedback may be stored as part of the application data along with the corresponding inference data. By contrast, explicit feedback may be provided subsequent to the execution of the related inference call to the trained machine learning model and may thus require a correlation to be established between the explicit feedback and the corresponding inference call. The controller 400 may therefore store the explicit feedback in generic persistency in order to reduce the total development cost associated with implementing the machine learning application.

Figure 4B:
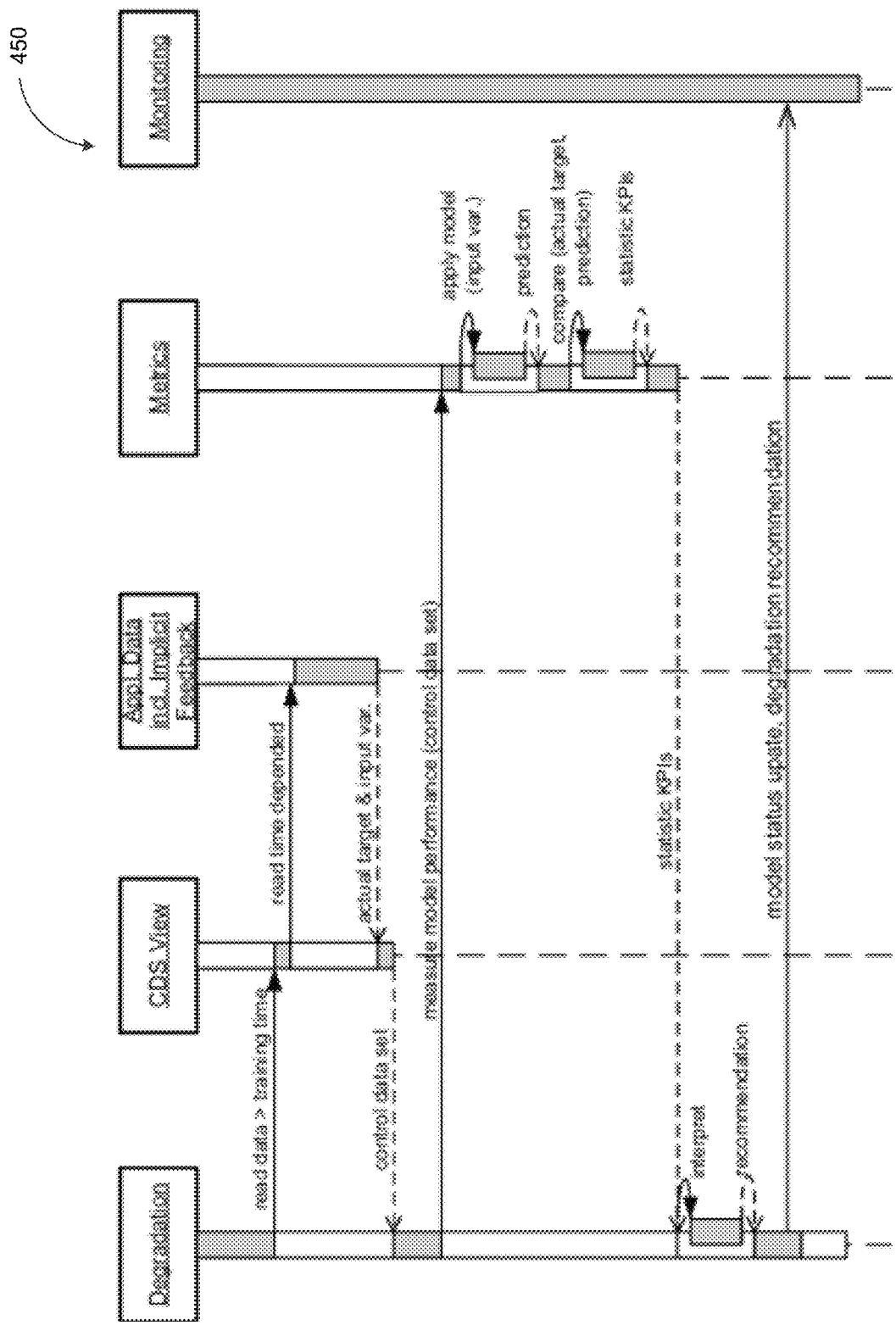
FIG. 4B depicts a sequence diagram illustrating an example of a process for detecting the degradation of a machine learning model, in accordance with some example embodiments.

FIG. 4B depicts a sequence diagram illustrating an example of a process 450 for detecting the degradation of a machine learning model, in accordance with some example embodiments. Referring to FIGS. 4A and 4B, the degradation of a machine learning model may be detected based on implicit feedback without further investigating the effected machine learning application because implicit feedback may be stored as part of the application data and exposed via core data service views for training the machine learning model. An example of implicit feedback may include a user confirming the priority assigned to a ticket by the machine learning model or refuting the priority assigned to the ticket by at least modifying the priority assigned to the ticket by the machine learning model. One or more accuracy key performance indicators of the machine learning model may decrease if the priority assigned to the ticket by the machine learning model is refuted more than a threshold quantity of time and/or at more than a threshold frequency. The priority that is assigned to a ticket priority may be part of the core data service view for the training of the machine learning model. These core data service views may be time-dependent by at least having fields for selecting data records for a specific period of time. In order to determine the performance of the machine learning model, the degradation component may identify, based at least on the core data service views, new input datasets that are received at the machine learning model since a previous training of the machine learning model. Because implicit feedback may be part of the application data, the control dataset may contain the input values as well as the correct output values corresponding to each of the input values. A current version of the trained machine learning model may be applied to determine the current output values of the machine learning model. Moreover, the metrics component may compute one or more accuracy key performance metrics for this current version of the machine learning model by at least comparing the current output values of the machine learning models and the correct values for the corresponding input values. The degradation component may further determine, based at least on the one or more accuracy key performance indicators, one or more recommendations to retrain the machine learning model and/or adjust the definition of the machine learning model. Table 1 below depicts programming code associated with a time-dependent training core data service view.

TABLE 1

@AbapCatalog.sqlViewName: 'TicketTraining'
@ClientHandling.algorithm: *SESSION_VARIABLE
@VDM.viewType: *COMPOSITE
@AbapCatalog.preserveKey: true
@AccessControl.authorizationCheck: *NOT_REQUIRED
@EndUserText.label: 'C_TicketPriorityTraining'
define view C_TicketPriorityTraining as select from ticket
association [1] to actionlog as _actions
on ticket.incidentid = _actions.incidentid {
    key incidentid,
description,
status,
component,
priority,
reporter,
processor,
pt as processingteam,
sid as systemid,
lastupdate,
created,
link as attachment,
_actions
}

Figure 5:
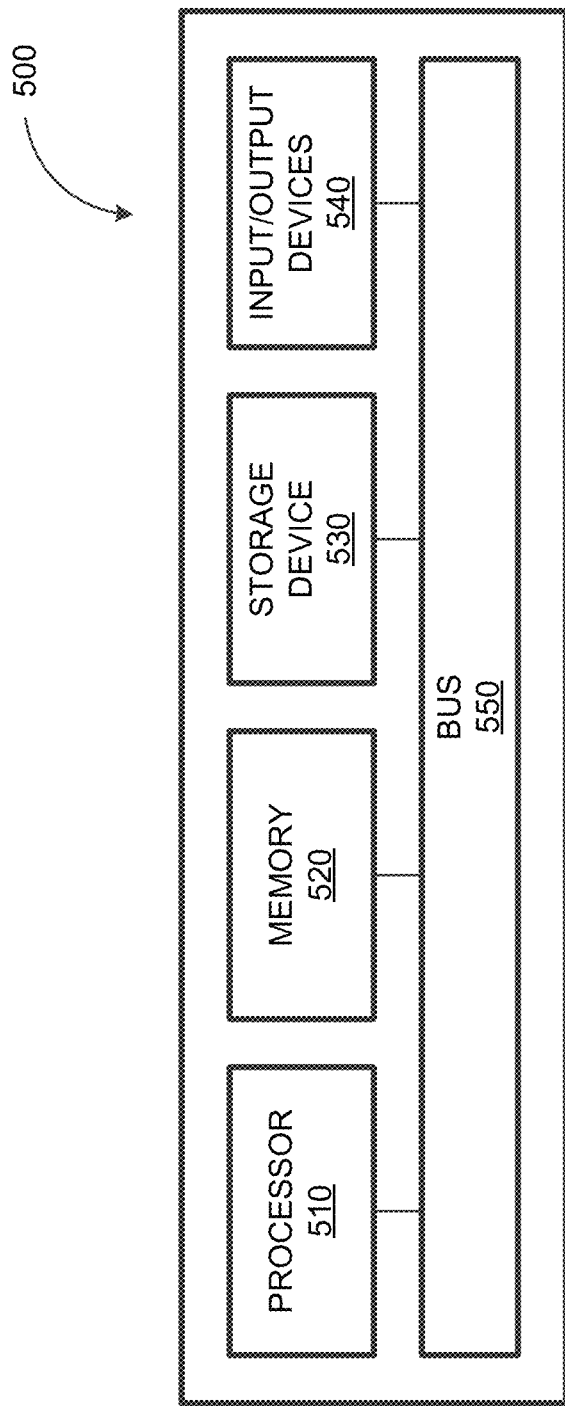
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1-5, the computing system 500 can be used to implement the controller 110 and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the controller 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid-state device, and/or any other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
    at least one data processor; and
    at least one memory storing instructions which, when executed by the at least one data processor, result in operations comprising:
        training, based at least on a first training dataset, a machine learning model;
        detecting a drift and skew in a first distribution of an input dataset of the machine learning model, wherein the input dataset of the machine learning model deviates from the first training dataset used to the train the machine learning model;
        detecting, based at least on the drift and skew in the first distribution of the input dataset and one or more accuracy key performance indicators associated with the machine learning model, a degradation of the machine learning model, the one or more accuracy key performance indicators including a prediction power metric measuring an ability of the machine learning model to generate, for each input value, a correct output value; and
        in response to detecting the degradation of the machine learning model, retraining the machine learning model, the machine learning model retrained based at least on a second training dataset that includes at least one training sample not included in the first training dataset.

2. The system of claim 1, wherein the one or more accuracy key performance indicators further include a prediction confidence metric measuring an ability of the machine learning model to achieve a same performance for different input datasets having one or more same characteristics as the first training dataset.

3. The system of claim 1, wherein the machine learning model is trained to perform a text classification including by assigning, to one or more tickets generated by an issue tracking system, a priority corresponding to a severity of an error associated with the one or more tickets.

4. The system of claim 1, wherein the drift and skew in the input dataset of the machine learning model is detected based at least on a change in a content of one or more tickets generated by an issue tracking system.

5. The system of claim 1, wherein the degradation of the machine learning model is further detected based on a drift and skew in a second distribution of an output dataset of the machine learning model.

6. The system of claim 5, wherein the drift and skew in the distribution of the output dataset of the machine learning model is detected based at least on a change in a relative proportion of tickets being assigned a first priority by the machine learning model and tickets assigned a second priority by the machine learning model.

7. The system of claim 1, wherein the degradation of the machine learning model is further detected based on a feedback received from a user associated with the enterprise resource planning system.

8. The system of claim 7, wherein the feedback includes explicit feedback comprising the user ranking, voting, flagging, polling, and/or commenting on a performance of the enterprise resource planning system and/or the machine learning model.

9. The system of claim 1, wherein the feedback includes implicit feedback comprising the user confirming and/or modifying a priority assigned by the machine learning model to one or more tickets generated by an issue tracking system.

10. The system of claim 1, wherein the first training dataset and the second training dataset each includes a plurality of training samples, and wherein each of the plurality of training samples comprises a ticket assigned a correct priority.

11. The system of claim 10, wherein an error in an output of the machine learning model corresponds to a difference between a priority assigned to each of the plurality of training samples by the machine learning model and the correct priority associated with each of the plurality of training samples, and wherein the machine learning model is trained and retrained by at least minimizing the error in the output of the machine learning model.

12. The system of claim 11, wherein the error in the output of the machine learning model is minimized by at least adjusting one or more weights applied by the machine learning model until a gradient of an error function associated with the machine learning model converges to a threshold value.

13. The system of claim 1, wherein the machine learning model comprises a neural network, a regression model, an instance-based model, a regularization model, a decision tree, a random forest, a Bayesian model, a clustering model, an associative model, a dimensionality reduction model, and/or an ensemble model.

14. A computer-implemented method, comprising:
    training, based at least on a first training dataset, a machine learning model;
    detecting a drift and skew in a distribution of an input dataset of the machine learning model, such that the input dataset of the machine learning model deviates from the first training dataset used to the train the machine learning model;
    detecting, based at least on the drift and skew in the distribution of the input dataset and one or more accuracy key performance indicators associated with the machine learning model, a degradation of the machine learning model, the one or more accuracy key performance indicators including a prediction power metric measuring an ability of the machine learning model to generate, for each input value, a correct output value; and
    in response to detecting the degradation of the machine learning model, retraining the machine learning model, the machine learning model retrained based at least on a second training dataset that includes at least one training sample not included in the first training dataset.

15. The method of claim 14, wherein the one or more accuracy key performance indicators further include a prediction confidence metric measuring an ability of the machine learning model to achieve a same performance for different input datasets having one or more same characteristics as the first training dataset.

16. The method of claim 14, wherein the degradation of the machine learning model is further detected based on a drift and skew a second distribution of an output dataset of the machine learning model.

17. The method of claim 14, wherein the degradation of the machine learning model is further detected based on an implicit feedback and/or an explicit feedback received from a user associated with an enterprise resource planning system implemented using the machine learning model.

18. The method of claim 14, wherein the machine learning model comprises a neural network, a regression model, an instance-based model, a regularization model, a decision tree, a random forest, a Bayesian model, a clustering model, an associative model, a dimensionality reduction model, and/or an ensemble model.

19. A non-transitory computer-readable medium storing instructions, which when executed by at least one data processor, result in operations comprising:

training, based at least on a first training dataset, a machine learning model;

detecting a drift and skew in a distribution of an input dataset of the machine learning model, wherein the input dataset of the machine learning model deviates from the first training dataset used to the train the machine learning model;

detecting, based at least on the drift and skew in the distribution of the input dataset and one or more accuracy key performance indicators associated with the machine learning model, a degradation of the machine learning model, the one or more accuracy key performance indicators including a prediction power metric measuring an ability of the machine learning model to generate, for each input value, a correct output value; and in response to detecting the degradation of the machine learning model, retraining the machine learning model, the machine learning model retrained based at least on a second training dataset that includes at least one training sample not included in the first training dataset.

\* \* \* \* \*